April 1, 1924.
O. O. NYGAARD
SHOCK ABSORBER
Filed Oct. 20, 1920
1,488,646
2 Sheets-Sheet 1
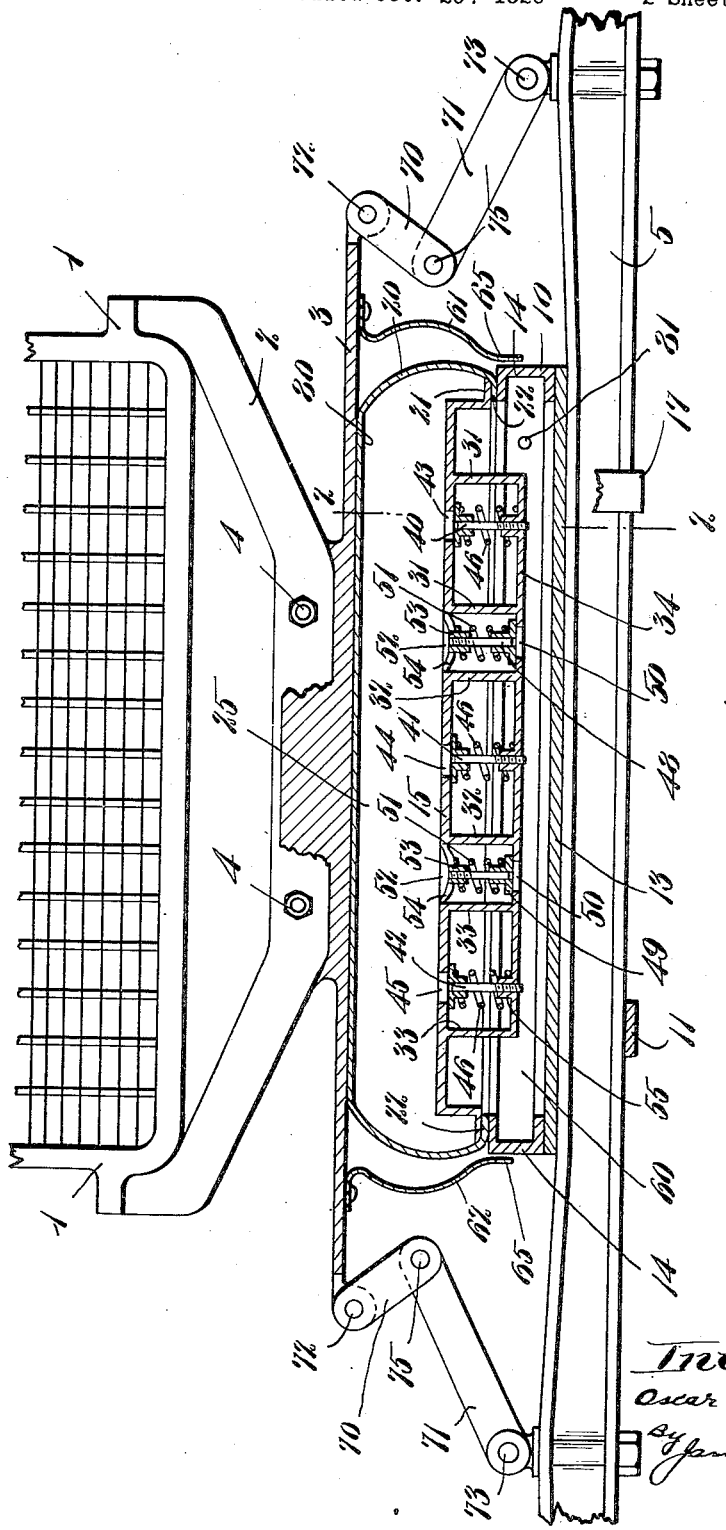

April 1, 1924.  1,488,646
O. O. NYGAARD
SHOCK ABSORBER
Filed Oct. 20, 1920   2 Sheets-Sheet 2
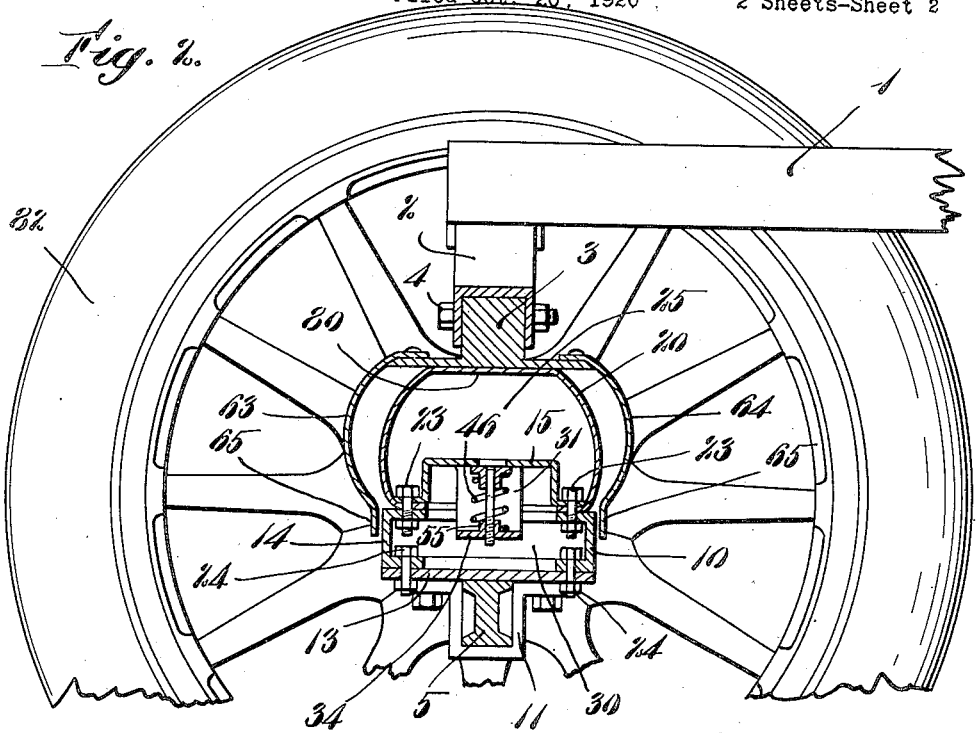
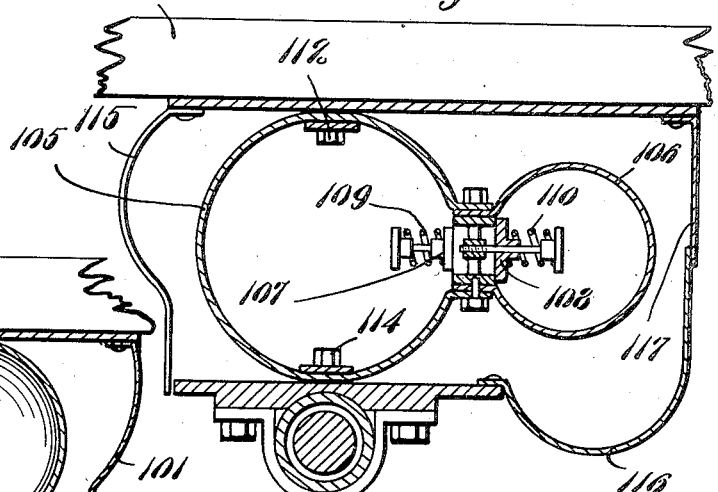
Inventor:
Oscar O. Nygaard
By James R. Hodder
Attorney Patented Apr. 1, 1924.

1,488,646

UNITED STATES PATENT OFFICE.

OSCAR O. NYGAARD, OF SAUGUS, MASSACHUSETTS.

SHOCK ABSORBER.

Application filed October 20, 1920. Serial No. 418,271.

*To all whom it may concern:*

Be it known that I, OSCAR O. NYGAARD, a citizen of the United States, and resident of Saugus, in the county of Essex and State of Massachusetts, have invented an Improvement in Shock Absorbers, of which the following description, in connection with the accompanying drawings, is a specification, like letters on the drawings representing like parts.

My present invention relates to shock absorbers and the object of the invention is to improve and perfect such devices. My present invention of a shock absorbing or cushioning device is intended to utilize the resilient and compressible action of air, either under initial pressure or at normal atmospheric pressure, and either in combination with or independently of additional springs or similar yielding members. Heretofore in the construction and design of shock absorbing devices, such as those intended for use on automobiles, trucks or the like, the shock absorbing member has been generally designed as an auxiliary device, in addition to and usually supplementary to the steel springs of the vehicle. My present invention, while capable of use in conjunction with and supplemental to steel springs, in such vehicles as automobiles, may be and preferably will be utilized as a substitute for such steel springs. In fact it is an important object of my present invention to provide a combined cushioning and shock absorbing apparatus which will support the vehicle body on the running gear, thereby taking the place of the usual springs, and will also contain shock absorbing qualities. My invention, broadly considered, thus comprises a supporting, yielding, cushioning and resilient shock absorbing apparatus, preferably so constructed and arranged as to be the load supporting member between the vehicle body and the running gear, either one or a plurality of such devices being utilized in each vehicle.

In carrying out my invention, I prefer to employ a resilient receptacle, such as a textile or rubber bag or cylinder, with means securing the same to the vehicle body and to the running gear, so that the bag or bags, cylinder or cylinders, will support the load to be carried by the running gear, with provision, nevertheless, for a practically universal yielding movement, vertically, horizontally and in any angular or universally movable action therebetween, such universal yielding movement being preferably limited by fixed guards or guides. A simple manner of carrying out the invention, consists in providing between the axles or supporting frame for the axles, and the crossbars or framework of the body, a cylindrical bag, filled to desired pressure with compressed air, and enclosing and protecting such cylindrical bag by metal guard members. I find that this construction can be made very compact, very ornamental and in a rigid, economical and efficient manner, permitting the full resilient, and cushioning action of the cylindrical air containing means, and protecting the same from injury, damage by weather conditions, and the like.

I prefer to utilize an auxiliary air receiving receptacle and to have one or more yielding valves uniting the direct load sustaining or cushioning receptacle with this auxiliary or supplemental air retaining device. Preferably also such spring pressed valves are set to desired tension and will retard the transfer of the air from one receptacle to the other. Thus my invention includes means, preferably automatic and preferably yielding at a predetermined point of compression, to retard the compression and transfer from one cushioning receptacle into the other and back again. This effects a shock absorbing result in addition to the compressibility of the air, both from the immediate load supporting member into the auxiliary receptacle and back again, thereby producing a further and automatic yielding, cushioning, shock absorbing action during the vertical or other compressible movements of the body and running gear. While I preferably employ air under compression for this action it will be understood that any equivalent elastic fluid may be utilized within the scope of my present invention.

Further important features, details of construction and novel combinations of parts, will be hereinafter more fully pointed out and claimed.

Referring to the drawings, illustrating preferred embodiments of my invention,

Fig. 1 is a side view, partially shown in cross-section, of a simple application of my invention to an automobile;

Fig. 2 is a cross-sectional view on the line 2—2 of Fig. 1, of the form shown in Fig. 1;

Fig. 3 is a cross-sectional view illustrating a modification; and

Fig. 4 is a further modification shown in cross-section.

Referring to Fig. 1, I have indicated in conventional form the forward portion of the vehicle body of a pleasure automobile, with side frames 1, supported on a forward cross-bar 2 to which is attached the crossrod 3 by bolts 4, 4. In prior constructions the cross-bar 2 is usually made as channel iron and has been employed to rest on the springs of the vehicle. In carrying out my invention, I may remove the springs and affix the crossrod 3. At 5 is indicated the axle supporting member or portion of the running gear, on which, formerly, the metallic springs would usually rest. In this form of my invention, I have eliminated the metallic springs and prefer to employ my load supporting and shock absorbing member as a substitute for both prior springs and prior shock absorbing devices.

Attached to the axle bar 5 is a metallic rectangular box 10, preferably made to rest upon the axle bar 5 and to be bolted thereto by attachment to a plurality of U-shaped members 11. The box 10 may comprise a base plate 13, side members 14, and a top member 15, the latter preferably containing a plurality of valve boxes to be described. This arrangement facilitates the assembling of the air containing receptacle or cylindrical bag 20 by having the top 15 formed with flanges 21 which may engage with and rest upon the marginal edge portions 22 of the bag 20 and be firmly secured in air tight position by bolts 23.

The receptacle 10 may be made as a unitary member if desired, but I prefer to secure side members 14 to the base 13 by a plurality of bolts 24, 24, as clearly shown in Fig. 2. A coating of varnish, a rubber gasket or other desired air tightening means can be employed.

The top member 15 of the receptacle 10 carrying the plurality of valve openings to permit a reciprocal interchange of elastic fluid under compression from the inner area 25 of the bag 20 to the inner area 30 of the receptacle 10, will now be described. This plate 15 is provided with a plurality of cross-webs 31, 31, 32, 32, and 33, 33, carrying on the lowermost part a bottom 34. These plates 15 and 34 are parallel and provide vertical bearings for a plurality of valve-stems. The valves and valvestems 40, 41 and 42 are arranged to cooperate with ports 43, 44 and 45. These valves are normally held in position to close the ports 43, 44 and 45 by coiled springs 46, 46, but permit an inward release in case the pressure within the area 25 is compressed by the load or action of the vehicle to exceed the strength of the springs. Conversely valves 48 and 49 opening through ports 50 in the reverse direction, permit a return of elastic fluid from area 60 within the receptacle 10, back to the area 25, when the load on the vehicle is lightened, or the rebounding action of the vehicle reduces the pressure from the area 25 sufficiently for these other valves to act, allowing a return of elastic fluid from the area 60. These springs 46, operating on the valves 43, 44 and 45, and the springs 51, holding the reversely operating valves 48 and 49 are preferably of equal tension but may be varied if desired. The webs noted in pairs as 31, 31, 32, 32 and 33, 33 are open at the sides, as clearly shown in Fig. 2, while the valve chambers between 31 and 32 and 32 and 33 are closed at the sides, and open at the base 52 to be in communication with the area 25. In this arrangement the valve stems for the valves 48 and 49 run through sleeves 53 held by an open arbor 54. In the valves 40, 41 and 42, these stems run through fixed hubs 55 attached to the base plate 34.

Surrounding the yielding receptacle 20 are guard members 61 and 62 at each end and 63 and 64 at front and back. Preferably these guard members are spaced sufficiently from the adjacent portions of the cylindrical bags 20 to permit the maximum expansion due to yielding of the bag during operation, but preferably also these guard members have a portion, as shown at 65, adapted to engage with some rigid part, such for example as the vertical outer walls of the box 10, to limit the forwardly and backwardly or lateral oscillations of the support 3 while permitting substantially unlimited vertical reciprocations. These guard members 61 to 64, may also be made of spring metal, so as to effect a yielding stop action.

As further guiding means I attach the links 70 and 71 to the yielding crossrod 3 at 72 and to the fixed axle support 5 at 73 by pivotal connections, the links being pivoted at 75. This construction allows freedom of movement, but a sufficiently rigid construction between the vehicle body and the running gear to prevent undue strain and distortion upon the resilient bag 20.

A further and important feature of my present invention consists in the fact that as the load or strain increases, the supporting element increases in a direct and automatic proportion. Thus the bag 20, being under pressure to support the vehicle, will be somewhat deflated, as indicated at 80, Figs. 1 and 2. This deflation affords a relatively large supporting area between the crossrod 3, which is in the form of a plate, and the supporting element 20. As the load increases, the supporting area also increases at this point, and simultaneously the increasing load will increase the compression within the chamber 25. This capability of the construction embodying my invention, insures a relatively long serviceability and wearing life to the resilient bag or receptacle 20, particularly if rubber is involved in its composition. Also the increasing surface to support the increasing load enables the bag 20 to have the increased load distributed over a larger supporting surface, in contra-distinction to having the increased strain all concentrated at one point or line. To supply the desired pressure a usual air valve 81 is supplied.

The operation and serviceability of my combined supporting and shock absorbing member will be readily appreciated. The bag 20 being supplied with predetermined air pressure to support the normal load at desired deflation of the bag 20, will automatically yield in a universal manner during bumps, jars, shocks or torsional strains, and will afford an easy and resilient cushioning support for the body of the vehicle. Undue lurches will be prevented by the guard members 61, 62, 63, 64, which will limit such lateral or longitudinal movements by the yielding stops afforded by contact with the rigid receptacle 10, acting to restore the vehicle to alinement with the running gear or chassis. In case of increased loads or increased strains upon the receptacle 20, the valves opening into the lower receptacle 10, will permit an egress of air therethrough, the valve springs therefor being preferably adjusted to a desired tension. In case of rebound or lightening of the load, the air in the receptacle 10 may also transfer into the upper receptacle but a restraining action is accorded by the tension of the springs on said valves, thereby preventing too free a passage and acting to stabilize the action of the vehicle body relatively with the running gear by retarding the transverse flow of air. Thus the benefit of resilient and cushioning air or similar elastic fluid, preferably both as a supporting element and as a shock absorbing element, is attained in an extremely simple, compact, and neat appearing structure. Furthermore, the compact arrangement enables a lower center of gravity to be attained between the vehicle body and chassis, yet with full yielding and cushioning supporting effect. I believe that this arrangement of air cushioning means or devices, directly interposed between the supporting axle or wheels 82 of a vehicle, and the vehicle body, is novel. Any arrangement utilizing elastic fluid as a supporting and cushioning means between the running gear and vehicle body is within the scope of my invention. In Figs. 3 and 4 I have illustrated modified forms. In Fig. 3 the side frame 1 is shown as having a plate 85 resting directly upon a ball 90, inflated by elastic fluid. A plurality of these balls may be arranged in place of the circular bag 20, already described. This ball 90 will preferably be supported by a supplementary box 91 having a spring pressed valve 92 therein, controlling a port 93 into the ball 90, this box 91 being directly supported on the casing 95 and the axle 100. Similar arrangement of yielding guards 101, 101, to those already described at 61 to 64 would be here provided.

In Fig. 4 a still further modification is illustrated wherein two cooperating yielding receptacles 105 and 106 are arranged with reciprocating valves 107 and 108 held by springs 109 and 110 respectively, which springs control the release of undue pressure from one ball to another. In this form I may desire to secure or bolt the walls of the receptacle 105 to the frame as shown at 112 and to the axle supporting portion as shown at 114, and this receptacle 105 may be metallic if desired. Spring guards 115, 116 and 117, also protect this supporting and cushioning means from weather, dust and damage. The operation of the forms shown in Figs. 3 and 4 is substantially similar to that already described, but in case metal is utilized the resiliency of the metal will be added to that of the elastic fluid contained within.

Various other modifications may be utilized. Furthermore, while I prefer a resilient receptacle such as a rubber or textile bag or cylinder for some forms, an equally resilient air containing article may be made by sheet metal such as in the form shown in Fig. 4, and in this case sheet metal combined with the resiliency of the air under pressure therein, to afford the supporting and shock absorbing functions of the apparatus. Any such use of a direct supporting and yielding air cushioning device, particularly when interposed between the vehicle body and its running gear, either the axles or chassis, carries out my invention. Briefly, my idea may be broadly considered as the utilization of a pneumatic cushion tire-like device for a vehicle supporting or shock absorbing apparatus, or both. Also the means permitting the compression of the air to be controlled by spring valves and to both increase and decrease during variations in load or strain, preferably by opening into adjacent receptacles, adds efficiency to practical forms of the invention.

My invention is further described and defined in the form of claims as follows:

1. In a cushioning device, a flexible receptacle having an automatically variable load supporting area proportional to the load to be carried on the load carrying member of a vehicle, a rigid receptacle additional thereto in operative connection therewith, a portion of which extends into the interior of said flexible receptacle, to reduce the volumetric capacity of said flexible receptacle, and leaving the walls of said flexible receptacle free to expand and contract, and to form itself to support any tilt or movements other than vertical according to the load supported, and means located within said interior extended portion to automatically control the rebounding action of said flexible receptacle.

2. In a vehicle, a pair of members spaced apart from but associated with each other, a flexible fluid holding receptacle for yieldingly supporting one member on the other, an auxiliary fluid holding receptacle cooperatively connected to said flexible receptacle, a member separating the receptacles, said member extending into the interior of said flexible receptacle to reduce the volumetric capacity thereof, and said member having means therein to retard and moderate the rebounding action of said flexible receptacle.

3. In a vehicle, a pair of members spaced apart from but associated with each other, a flexible fluid holding receptacle for yieldingly supporting one member on the other, an auxiliary fluid holding receptacle attached to said flexible receptacle, connecting means for fluid supply to said receptacles, a diaphragm between said receptacles, said diaphragm being box-shaped or curved and extending into the flexible receptacle to decrease the volumetric capacity thereof and correspondingly increase the volumetric capacity of said auxiliary receptacle, and means in said diaphragm to control the flow of fluid from one of said receptacles to the other.

4. In a vehicle, a pair of members spaced apart from but associated with each other, a flexible fluid holding receptacle for yieldingly supporting one of said members on the other, a rigid fluid holding receptacle connected to said flexible receptacle, a member covering said flexible receptacle, means on said member for rigidly connecting to one of said spaced members and flexibly connecting to said other spaced member, a plurality of guiding plates attached to said member, said guiding plates adapted to slide on said rigid receptacle to yieldingly resist any motion of said spaced members other than vertical.

In testimony whereof, I have signed my name to this specification.

OSCAR O. NYGAARD.